US008984406B2

(12) United States Patent
Pueyo et al.

(10) Patent No.: US 8,984,406 B2
(45) Date of Patent: Mar. 17, 2015

(54) METHOD AND SYSTEM FOR ANNOTATING VIDEO CONTENT

(75) Inventors: Lluis Garcia Pueyo, Barcelona (ES); Chris Kalaboukis, San Jose, CA (US)

(73) Assignee: Yahoo! Inc!, Sunnyvale, CA (US)

( * ) Notice: Subject to any disclaimer, the term of this patent is extended or adjusted under 35 U.S.C. 154(b) by 753 days.

(21) Appl. No.: 12/433,052

(22) Filed: Apr. 30, 2009

(65) Prior Publication Data

US 2010/0281373 A1     Nov. 4, 2010

(51) Int. Cl.
| | |
|---|---|
| *H04N 21/21* | (2011.01) |
| *H04N 21/6587* | (2011.01) |
| *H04N 21/23* | (2011.01) |
| *H04N 21/2343* | (2011.01) |
| *H04N 21/44* | (2011.01) |
| *H04N 21/472* | (2011.01) |
| *H04N 21/4728* | (2011.01) |
| *H04N 21/858* | (2011.01) |

(52) U.S. Cl.
CPC ........... *H04N 21/6587* (2013.01); *H04N 21/21* (2013.01); *H04N 21/23* (2013.01); *H04N 21/234318* (2013.01); *H04N 21/44008* (2013.01); *H04N 21/47205* (2013.01); *H04N 21/4728* (2013.01); *H04N 21/8583* (2013.01)
USPC .......................................... 715/723; 715/230

(58) Field of Classification Search
USPC .................................. 715/723, 730; 345/619
See application file for complete search history.

(56) References Cited

U.S. PATENT DOCUMENTS

| | | | |
|---|---|---|---|
| 5,307,456 A | 4/1994 | MacKay | |
| 5,519,828 A | 5/1996 | Rayner | |
| 5,826,102 A | 10/1998 | Escobar et al. | |
| 6,029,194 A | 2/2000 | Tilt | |
| 6,339,431 B1 * | 1/2002 | Ohmori et al. | 345/619 |
| 6,374,260 B1 | 4/2002 | Hoffert et al. | |
| 6,496,980 B1 | 12/2002 | Tillman et al. | |
| 6,615,212 B1 | 9/2003 | Dutta et al. | |
| 6,628,303 B1 | 9/2003 | Foreman et al. | |
| 6,976,028 B2 | 12/2005 | Fenton et al. | |
| 7,073,127 B2 | 7/2006 | Zhao et al. | |
| 2002/0116716 A1 | 8/2002 | Sideman | |

(Continued)

OTHER PUBLICATIONS

Suga, Akira et al. Object recognition and segmentation using SIFT and Graph Cuts, Pattern Recognition, 2008. ICPR 2008. 19th International Conference on, Dec. 2008.*

(Continued)

*Primary Examiner* — Matt Kim
*Assistant Examiner* — William Trapanese
(74) *Attorney, Agent, or Firm* — James J. DeCarlo; Greenberg Traurig, LLP (57) ABSTRACT

Disclosed is a method and system for annotating video. A software application operating on a user computing device monitors a first display of video content transmitted over a network from a video server. The software application detects an action performed by a user of the user computing device on a first frame of the video content during display of the first frame. The action corresponds to the user identifying a portion of the displayed video frame upon which to overlay a visible marking on the first frame. The marking is associated with an object in the first frame. The software application iteratively derives a further position for the marking in a further frame of the video content, the further position associated with the location of the object in the further frame. The software application generates metadata associated with the user and transmits the metadata to a metadata sever.

17 Claims, 6 Drawing Sheets

(56) References Cited

U.S. PATENT DOCUMENTS

| | | |
|---|---|---|
| 2002/0118300 A1 | 8/2002 | Middleton et al. |
| 2002/0143782 A1 | 10/2002 | Headings et al. |
| 2002/0144276 A1 | 10/2002 | Radford et al. |
| 2002/0194195 A1 | 12/2002 | Fenton et al. |
| 2003/0158928 A1 | 8/2003 | Knox et al. |
| 2003/0236886 A1 | 12/2003 | Oren et al. |
| 2004/0068758 A1* | 4/2004 | Daily et al. ............... 725/136 |
| 2004/0128317 A1 | 7/2004 | Sull et al. |
| 2005/0033758 A1 | 2/2005 | Baxter |
| 2005/0060422 A1 | 3/2005 | Rudolph et al. |
| 2005/0091691 A1 | 4/2005 | Maruya et al. |
| 2005/0144016 A1 | 6/2005 | Hewitt et al. |
| 2005/0228819 A1 | 10/2005 | Richards et al. |
| 2005/0289180 A1 | 12/2005 | Pabla et al. |
| 2007/0067707 A1 | 3/2007 | Travis et al. |
| 2007/0169158 A1 | 7/2007 | Folgner et al. |
| 2007/0179979 A1 | 8/2007 | Folgner et al. |
| 2007/0239787 A1 | 10/2007 | Cunningham et al. |
| 2007/0239788 A1 | 10/2007 | Cunningham et al. |
| 2007/0240072 A1 | 10/2007 | Cunningham et al. |
| 2008/0016245 A1 | 1/2008 | Cunningham et al. |
| 2008/0215620 A1 | 9/2008 | Folgner et al. |
| 2009/0087160 A1* | 4/2009 | Lui et al. ..................... 386/66 |
| 2009/0103835 A1 | 4/2009 | Folgner et al. |
| 2009/0106093 A1 | 4/2009 | Folgner et al. |
| 2009/0319885 A1* | 12/2009 | Amento et al. ............ 715/230 |

OTHER PUBLICATIONS

Everingham, Mark et al., Hello! My name is . . . Buffy—automatic naming of characters in TV video, Sep. 4-6, 2006, BMVC 2006.*

U.S. Appl. No. 11/622,948, filed Jan. 12, 2007, Folgner et al.

Yilmaz, Alper et al. "Object Tracking: A Survey", AMC Computing Surveys, vol. 38, No. 4, Article 13, Publication date: Dec. 2006.

Lowe, David G. "Distinctive Image Features from Scale-Invariant Keypoints", Jan. 5, 2004; Accepted for publication in the International Journal of Computer Vision, 2004.

Oliver, Nuria et al. "A Bayesian Computer Vision System for Modeling Human Interactions".

Shi, Jianbo et al. "Normalized Cuts and Image Segmentation".

Harris, Chris et al. "A Combined Corner and Edge Detector", Plessey Research Roke Manor, United Kingdom, (c) The Plessey Company pic. 1988.

Comaniciu, Dorin et al. "Mean Shift Analysis and Applications", Department of Electrical and Computer Engineering, Rutgers University, Piscataway, NJ 08854-8058.

Papageorgiou, Constantine P. et al. "A General Framework for Object Detection", Center for Biological and Computational Learning Artificial Intelligence Laboratory MIT, Cambridge, MA 02139.

Caselles, Vicent et al. "Geodesic Active Contours", International Journal of Computer Vision 22(1), 61-79 (1997) (c) 1997 Kluwer Academic Publishers. Manufactured in the Netherlands.

Monnet, Antoine et al. "Background Modeling and Subtraction of Dynamic Scenes", Real-Time Vision and Modeling, Siemens Corporate Research, 755 College Road East, Princeton, NJ 08540, USA.

Moravec, Hans P. "Visual Mapping by a Robot Rover", Stanford Artificial Intelligence Laboratory, Apr. 1979.

Mikolajczyk, Krystian et al. "An Affine Invariant Interest Point Detector", Inria Rhone-Alpes & Gravir-CNRS, 655, av. de l'Europe, 38330 Montbonnot, France.

Mikolajczyk, Krystian et al. "Scale & Affine Invariant Interest Point Detectors", International Journal of Computer Vision 60(1), 63-86, 2004 (c) 2004 Kluwer Academic Publishers. Manufactured in the Netherlands.

Rowley, Henry A. et al. "Neural Network-Based Face Detection" (PAMI, Jan. 1998).

Viola, P. et al. "Detecting Pedestrians Using Patterns of Motion and Appearance" TR2003-90 Aug. 2003, Copyright (c) Mitsubishi Electric Research Laboratories, Inc., 2003.

Stauffer, Chris et al. "Learning Patterns of Activity Using Real-Time Tracking", Artificial Intelligence Laboratory, Massachusetts Institute of Technology, Cambridge, MA 02139.

Toyama, Kentaro et al. "Wallflower: Principles and Practice of Background Maintenance", Microsoft Research, Redmond, WA 98052, International Conference on Computer Vision, Sep. 1999, Corfu, Greece.

Notification of Transmittal of the International Search Report and the Written Opinion of the International Searching Authority, or the Declaration (PCT/US07/60531).

International Search Report (PCT/US07/60525).

International Search Report (PCT/US07/60528).

International Search Report (PCT/US07/60530).

Adobe—Flash Player Version Penetration [online]. Adobe, Dec. 2006 [retrieved on Apr. 11, 2007]. Retrieved from the Internet: <http://adobe.com/products/player_census/flashplayer/version_penetration.html>.

One True Media Home [online]. One True Media, Inc., 2006 [retrieved on Nov. 7, 2006]. Retrieved from the Internet: <http://www.onetruemedia.com/>.

International Preliminary Report on Patentability mailed on Oct. 14, 2008 for PCT Application No. PCT/US2007/008917, filed Apr. 9, 2007, 8 pgs.

International Search Report and Written Opinion mailed on Feb. 14, 2008, for PCT Application No. PCT/US2007/08917 filed Apr. 9, 2007, 10 pgs.

International Search Report and Written Opinion mailed Oct. 2, 2007, for PCT Application No. PCT/US2007/008917 filed Apr. 9, 2007, 15 pgs.

International Search Report and Written Opinion mailed Sep. 28, 2007, for PCT Application No. PCT/US2007/008914 filed Apr. 9, 2007, 11 pgs.

Official Action from the United States Patent and Trademark Office dated Mar. 17, 2009 for U.S. Appl. No. 11/622,968.

Official Action from the United States Patent and Trademark Office dated Apr. 27, 2009 for U.S. Appl. No. 11/784,843.

* cited by examiner

METHOD AND SYSTEM FOR ANNOTATING VIDEO CONTENT

FIELD

The present disclosure relates to video and, more specifically, to using a user computing device to annotate video content.

BACKGROUND

Software programs that enable users to annotate video content currently exist. For example, a user may store video on his or her computer. When the user displays the video, the user may use one of these annotation programs to annotate, or overlay markings on, the video. Typically, the user will pause the video and overlay one or more markings on the video. This annotated video screen can then, for example, be displayed or broadcasted. For example, sportscasters often pause a sports program such as a football game being broadcast on television and mark up the screen. The sportscaster may then allow the video clip to run with the markings being displayed. The sportscaster may do this to illustrate to their audience one or more points related to the football game.

SUMMARY

The present disclosure relates to the annotation of video content. A software application operating on a user computing device monitors a first display of video content transmitted over a network from a video server. The software application detects an action performed by a user of the user computing device on a first frame of the video content during display of the first frame of the video content. The action corresponds to the user identifying a portion of the displayed video frame upon which to overlay a visible marking on the first frame of the video content. The marking is associated with an object appearing at a location in the first frame of the video content. The software application iteratively derives a further position for the marking in a further frame of the video content, the further position for the marking associated with the location of the object in the further frame. The software application generates, during the display of the video content, video content metadata associated with the user. In one embodiment, the video content metadata includes coordinate and/or time information. The software application transmits the video content metadata to a metadata server for storage.

Upon receiving a request from the user for a subsequent display of the video content, the software application retrieves (a) the video content over the network from the video server and (b) the video content metadata from the metadata server in order to display the video content with the visible marking in the subsequent display of the video content in accordance with the video content metadata.

In one embodiment, the detecting step further comprises applying a Scale Invariant Feature Transform (SIFT) detector to a region of interest in the first frame to extract interesting points from the region. A SIFT vector is generated from the extracted points. The SIFT detector can be applied to the further frame to extract interesting points from the further frame. SIFT vectors are generated from the interesting points extracted from the further frame. The SIFT vector corresponding to the region of interest is compared with the SIFT vectors corresponding to the further frame to derive a new position of the interesting points to determine a new position of the object in the further frame.

The visible marking can be on or can surround the object. The detecting step can include applying an affine invariant point detector, a segmentation technique, a background modeling technique, and/or a supervised classifier technique.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the invention that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Figure 1:
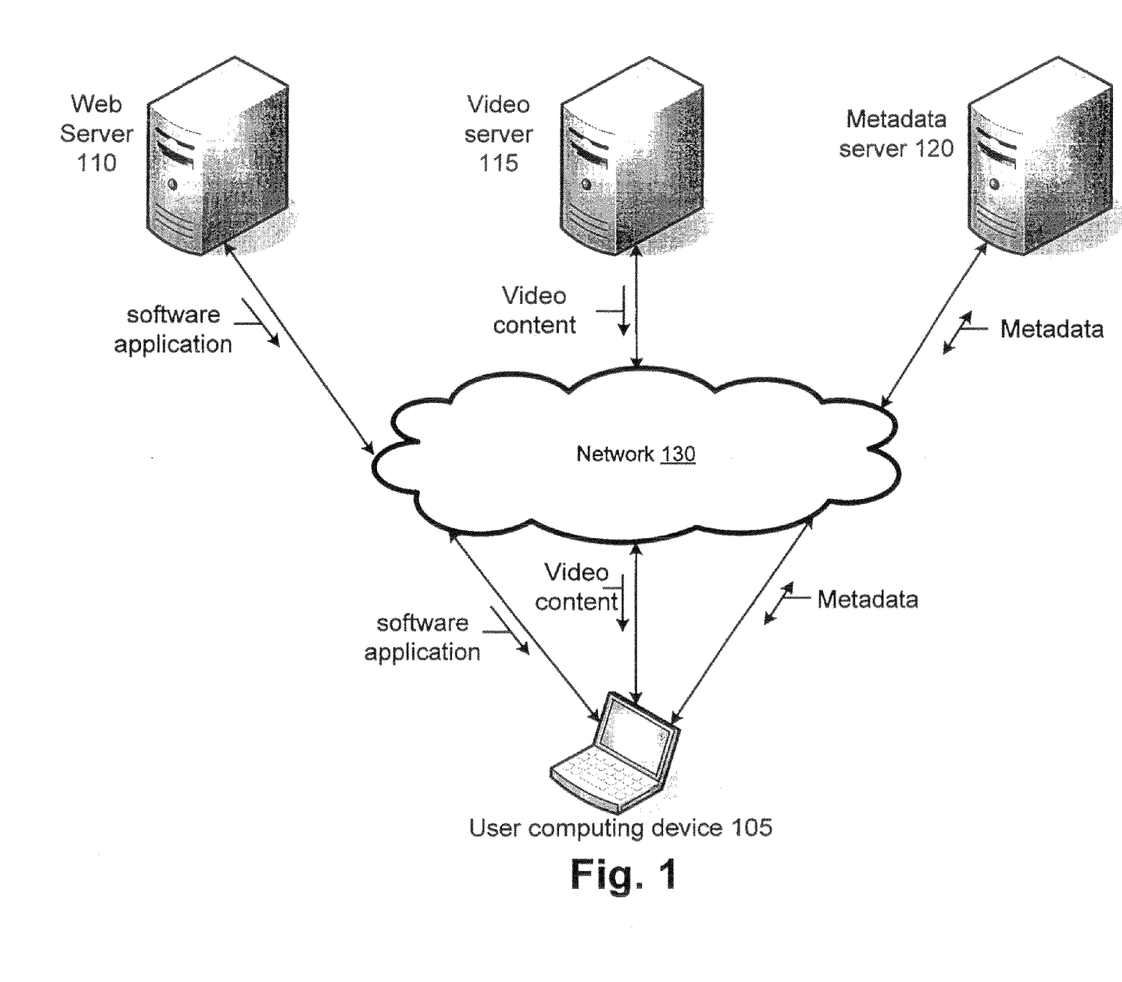
FIG. 1 is a block diagram of a computing device communicating with a web server, a video server, and a metadata server over a network in accordance with an embodiment of the present disclosure.

FIG. 1 shows a block diagram of an embodiment of a system having a user computing device 105 in communication with a web server 110, a video server 115, and a metadata server 120 over a network 130. The web server 110 transmits a software application 140 to the user computing device 105. In one embodiment, the user of the user computing device 105 uses a browser executing on the user computing device 105 to navigate to a particular web site that is provided by the web server 110. The user can then download the software application 140 over the network 130 to the user computing device 105. In one embodiment and as described in more detail below, the software application 140 is a software module (e.g., a Flash module) that can render video content. The software application 140 can also be a software module that works together with a media player to display and annotate the video content.

After downloading the software application 140, the user of the user computing device 105 retrieves video content 145 from the video server 115. In one embodiment, the user uses the user computing device 105 to navigate to a particular web page, such as YouTube®, provided by the video server 115. The user selects video content from the web page and the video server 115 transmits the selected video content 145 to the user computing device 105. The software application 140 displays the video content 145 on the user computing device's display. As described in more detail below, the software application 140 enables a user of the user computing device 105 to overlay one or more visible markings on the video content. For example, the user can use a mouse or stylus associated with the user computing device 105 to overlay the markings on the video content. The visible markings can include, for example, lines and/or shapes (e.g., circles, squares, triangles, and/or comic-like balloons). The visible marking(s) are overlaid on or near an object in the video content. In one embodiment, the user overlays the visible marking(s) on the video content as the video content is playing. In another embodiment, the user overlays the marking(s) on the video content after pausing the playing of the video content. In particular, the user overlays visible markings on a first frame of the video content. When a further frame of the video content is displayed on the user computing device 105, the software application 140 repositions the visible marking(s) on the further frame so that the marking(s) are still on or near their respective objects.

In one embodiment, the user selects a time segment during which the marking(s) are present in the video content. In this embodiment, when the time segment ends, the markings are then removed from the video content.

In one embodiment, the software application generates video content metadata 150 during the display of the video content. The video content metadata 150 is associated with the user. In one embodiment, the video content metadata 150 includes coordinate and time information. The amount of information generated can vary depending on the video content 145 itself and/or the marking(s). For example, the amount of video content metadata 150 generated can be different for marking(s) that are circles (e.g., x, y, radius) relative to video content metadata 150 associated with comic-like balloons (e.g., x,y, text) or squares (e.g., x1, y1, x2, y2). The software application 140 then transmits the video content metadata 150 to the metadata server 120 for storage.

In one embodiment, when the user computing device 105 receives a request from the user for a subsequent display of the video content 145, the user computing device 105 retrieves the video content 145 from the video server 115 (or the video server 115 transmits the video content 145 to the user computing device 105) and the video content metadata 150 from the metadata server 120. In one embodiment, the software application 140 uses the video content metadata 150 associated with the user to display the video content 145 with the previously denoted visible marking(s).

The video content metadata 150 is independent relative to the video content itself and is associated with the user that created the marking(s). For example, if a first user logs onto the user computing device 105, or server 115, or metadata server 120, and downloads the video content 145, the software application 140 can download video content metadata 150 related to this first user for the video content 145. The user computing device 105 then displays the video content 145 with the first user's markings overlaid on the video content 145. At a later point in time, if a second user that has created different marking metadata logs onto their user computing device 105 or one of the servers, and downloads the same video content 145, the software application 140 can download video content metadata 150 related to this second user for the video content 145. The second user's user computing device 105, which may the same or different device as used by the first user, can then display the video content 145 with the second user's markings overlaid on the video content 145. The particular act of logging in is for the purpose of the user identifying him or herself to a service that maintains a user data base or profile data or other user information that can link the user created metadata to a specific user and specific video content. In one embodiment the user data is maintained by the entity that provides the video marking software, or affiliates thereof.

For purposes of this disclosure, (See, e.g., FIG. 6) a computer or computing device such as the user computing device 105 and/or server 110, 115, 120 includes a processor and memory for storing and executing program code, data and software which may also be tangibly stored or read from any type or variety of well known computer readable storage media such as magnetic or optical discs, by way of non-limiting example. Computers can be provided with operating systems that allow the execution of software applications in order to manipulate data. Personal computers, personal digital assistants (PDAs), wireless devices, cellular telephones, internet appliances, media players, home theater systems, servers, and media centers are several non-limiting examples of computing devices. The user computing device 105 and the servers 110, 115, 120 can, in one embodiment, also include a display, such as a screen or monitor.

Figure 2:
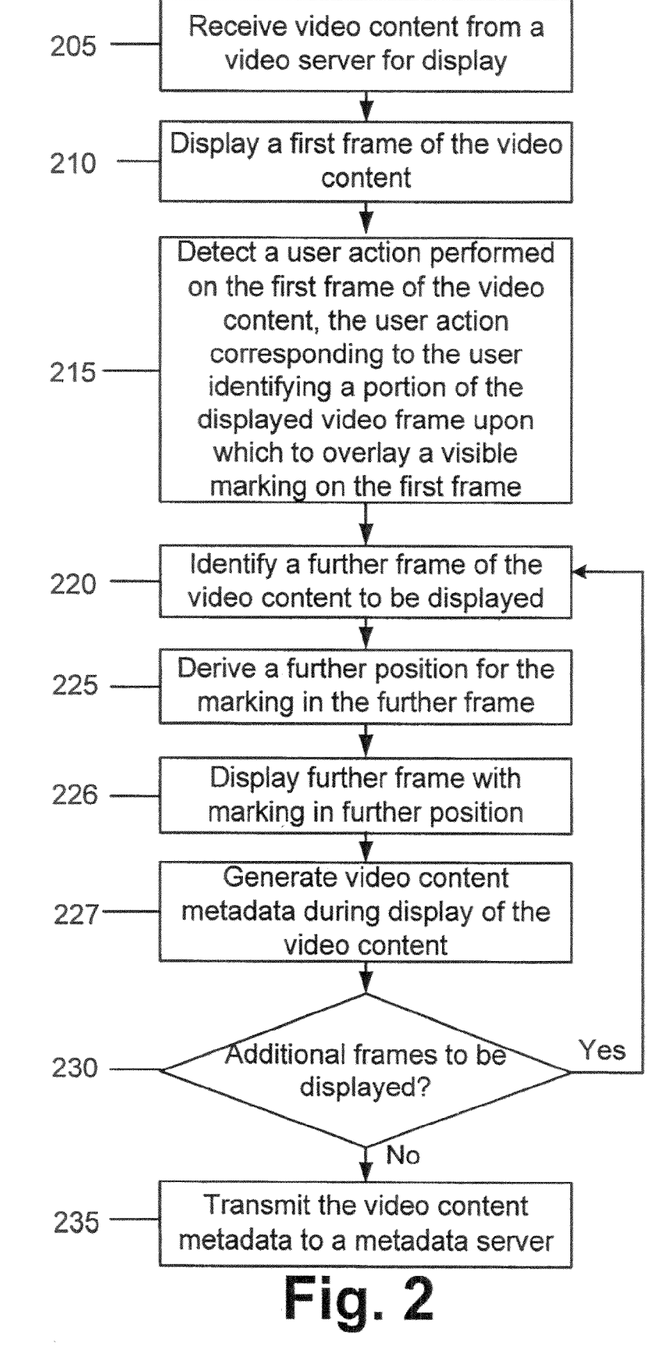
FIG. 2 is a flowchart illustrating the steps performed by the computing device of FIG. 1 to annotate and display video content in accordance with an embodiment of the present disclosure.

FIG. 2 is a flowchart showing an embodiment of the steps performed by the user computing device 105 associated with the display of video content 145. The user computing device 105 receives video content 145 from the video server 115 for display (step 205). The user computing device 105 (in one embodiment, the software application 140) displays a first frame of the video content in step 210. The software application 140 monitors the display of the video content and detects (step 215) a user action performed on the first frame of the video content, where the user action corresponds to the user identifying a portion of the displayed video frame upon which to overlay a visible marking on the first frame of the video content. The marking is associated with (e.g., on, surrounding, or near) an object in the video frame, such as a person, a person's head, a person's body, a person's arms or legs, an animal, a table, or any other object (animate or inanimate). The software application 140 then identifies, in step 220, a further frame of the video content to be displayed and derives (step 225) a further position for the marking in the further frame. In one embodiment, the further position of the marking is derived so that the marking maintains the same relative position to the object as the marking had in the first frame.

In one embodiment, the software application 140 tracks the objects of the video content 145 from one frame to the next in order to derive the further position(s) of the marking(s). Example methods of object tracking can include point detectors (e.g., Scale Invariant Feature Transform (SIFT) and/or affine invariant point detector), segmentation (e.g., mean-shift, graph-cut, and/or active contours), background modeling (e.g., mixture of Gaussians, Eigenbackground, wall flower, and/or dynamic texture background), and/or supervised classifiers (e.g., support vector machines, neural networks, and/or adaptive boosting).

As a specific example, the software application 140 can use a SIFT detector to track an object in a video frame. Given a first frame and a region or area inside the first frame, the software application 140 can apply the SIFT detector to extract "interesting" points in the region, or points that are identifiable relative to the rest of the region (e.g., a point that has a difference in intensity (or a difference in color or any other characteristic) above a threshold compared to the intensity (or color or characteristic) of points surrounding the identified point). These points are then described and stored as a SIFT vector. When a further frame of the video content 145 is displayed, the software application 140 applies the same SIFT detector over the entire image to obtain a group of SIFT vectors describing the interesting points. The software application 140 then compares the SIFT vectors extracted from the first frame (corresponding to the region of interest) to the SIFT vectors extracted from the further frame (corresponding to the entire image). When similar vectors are found, a new position of the interesting points can be derived and, as a result, the new position of the object (and the marking) can be determined. Thus, the tracking of the object and the corresponding derivation of a new position of the marking(s) associated with the object occurs at the user computing device 105.

For example, if a red quarter is in the top left portion of a video, and the rest of the video frame is black, the SIFT detector can detect the change in color between the red points and the black points. The algorithm therefore detects the red points as "interesting" points. In a later frame, if the red quarter has moved to the top right portion of the video, the SIFT detector can detect that the quarter has moved during the playing of the video because of the characteristics (in this case, color) of the points of the quarter relative to the rest of the frame.

In step 226, the software application 140 displays the further frame with the marking in its further position. In step 227, the software application 140 generates video content metadata during display of the video content. The video content metadata is associated with the user who has overlaid the video content with the markings. The software application 140 then determines if there are additional frames of the video content to be displayed (step 230). If so, steps 220-230 are repeated. If there are no additional frames to be displayed, the software application 140 transmits the video content metadata 150 that was generated in step 227 to the metadata server 120 in step 235. In another embodiment, the software application 140 transmits the video content metadata 150 to the metadata server 120 in step 227 after generating the metadata 150 (without waiting to determine if there are additional frames to be displayed).

Figure 3:
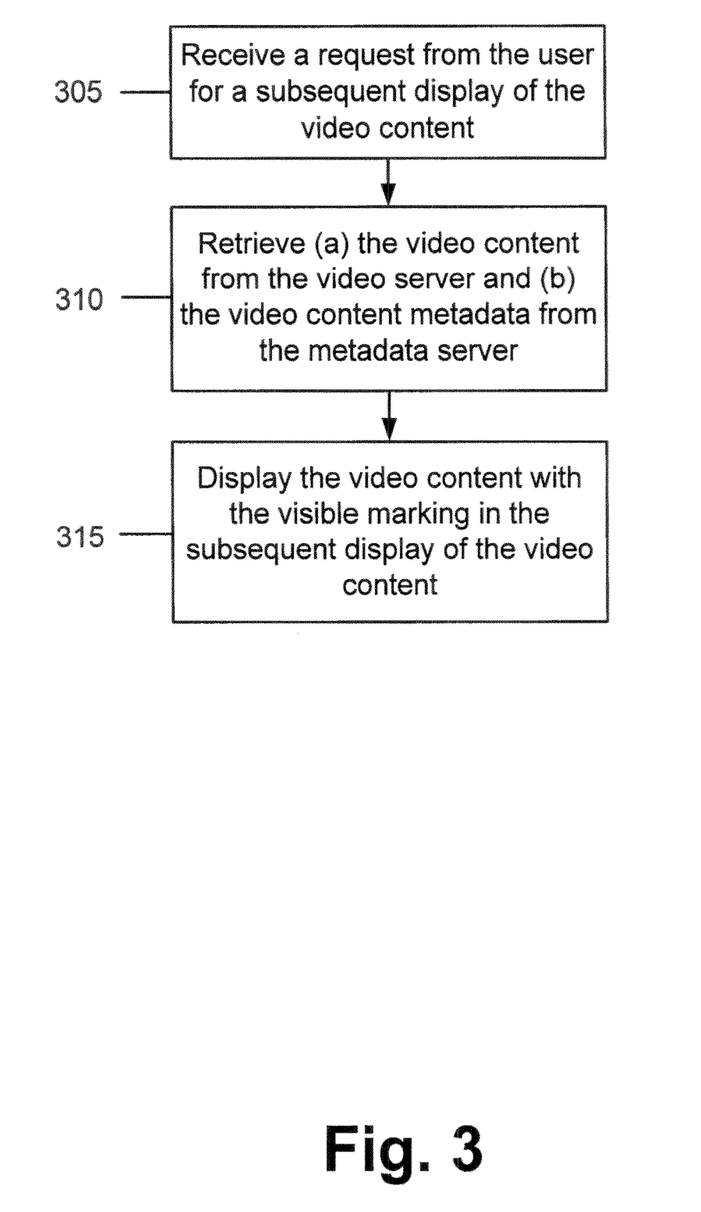
FIG. 3 is a flowchart illustrating the steps performed by the computing device of FIG. 1 to show a subsequent display of the video content in accordance with an embodiment of the present disclosure.

FIG. 3 is a flowchart showing an embodiment of the steps performed by the user computing device 105 after transmitting the video content metadata 150 to the metadata server 120. The user computing device 105 receives a request from the user for a subsequent display of the video content 145 (step 305). The user computing device 105 (the software application 140) retrieves the video content 145 from the video server 115 (or from memory of the user computing device 105 if the video content 145 has been saved locally) and also retrieves the video content metadata 150 for this video content 145 and associated with this user from the metadata server 120 (step 310). The software application 140 uses the video content metadata 150 to determine the position(s) of marking(s) that were previously incorporated into the video content. In step 315, the software application 140 displays the video content with the visible marking(s) in the subsequent display of the video content.

For example, if a first user uses the user computing device 105 to perform steps 205-235 of FIG. 2 and then steps 305-315 of FIG. 3, the user computing device 105 will display the video content in step 315 having the markings that the first user previously overlaid onto the video content in step 215. At a later point in time, a second user uses the user computing device 105 to perform the same steps 205-235 of FIG. 2 and steps 305-315 of FIG. 3. When the user computing device 105 displays the video content for the second user in step 315, the video content will be displayed differently than the display of the video content for the first user because the second user has different markings overlaid onto the video content (and, therefore, different video content metadata for the video content). Thus, the video content metadata is stored independent of the video content and is associated with the video content as well as the particular user who overlaid markings on the video content.

Figure 4:
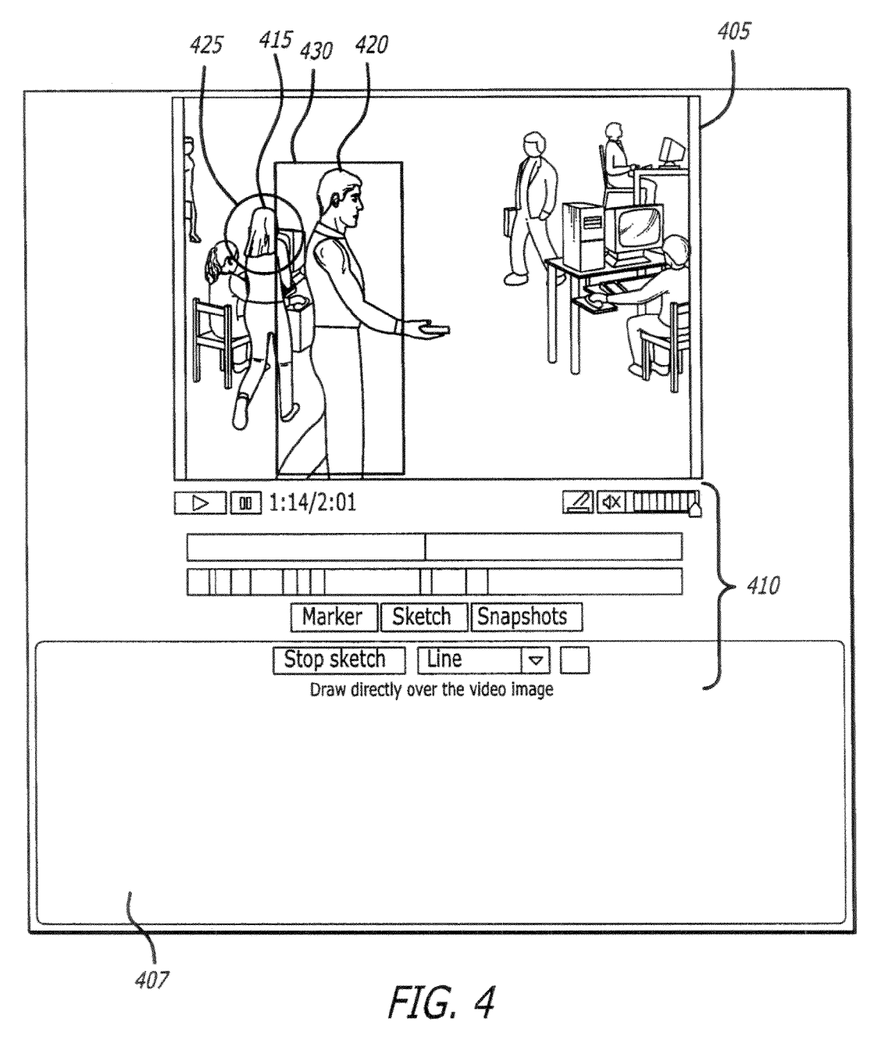
FIG. 4 is a screen shot of a first frame of video content with markings overlaid on the first frame in accordance with an embodiment of the present disclosure.

FIG. 4 depicts an exemplary user interface of an embodiment of a first frame 405 of video content with markings overlaid on the first frame 405. In particular, the user of the user computing device 105 uses software application 407 to display the first frame 405 of the video content. The software application 407 includes software tools 410 to overlay markings on the video frame. The first frame 405 includes a first person 415 and a second person 420. In one embodiment, the user uses the software tools 410 to overlay a first marking 425 (in this example, a circle) around the first person's head. The user can also use the software tools 410 to overlay a second marking 430 (in this example, a rectangle) around the second person 420.

Figure 5:
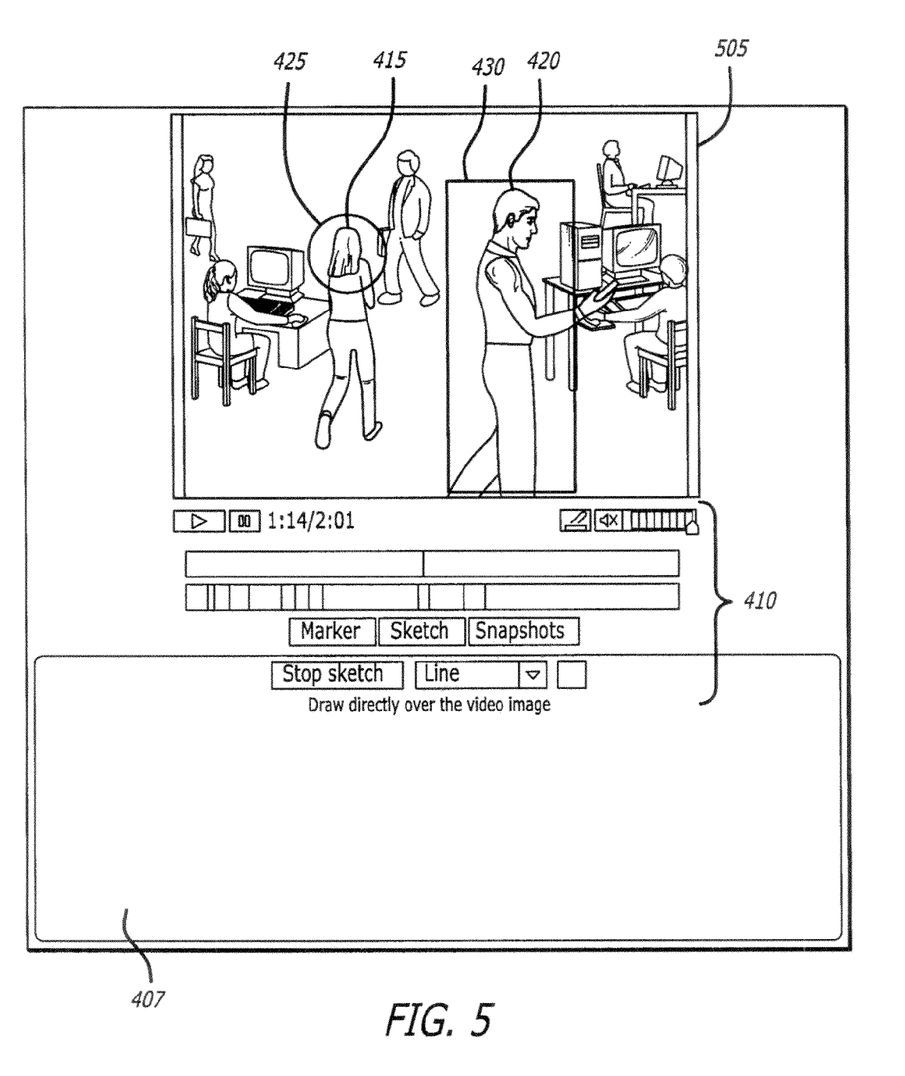
FIG. 5 is a screen shot of a further frame of the video content with the markings overlaid on the further frame in accordance with an embodiment of the present disclosure.

FIG. 5 depicts an exemplary user interface of an embodiment of a further frame 505 of the video content with the markings overlaid on the further frame 505. In this further frame 505, the first person 415 and the second person 420 are both in different locations compared with their locations in the first frame 405 in FIG. 4. The software application 407 determines these new locations of the first person 415 and the second person 420 and derives a new position for the first marking 425 and a new position for the second marking 430. The new positions for the first marking 425 and the second marking 430 are based on the new positions of the first person 415 and the second person 420. Thus, in this embodiment the first marking 425 is still a circle around the first person's head and the second marking 430 is still a rectangle around the second person 420.

Various implementations of the systems and techniques described here can be realized in digital electronic circuitry, integrated circuitry, specially designed ASICs (application-specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device. Such computer programs (also known as programs, software, software applications or code) may include machine instructions for a programmable processor, and may be implemented in any form of programming language, including high-level procedural and/or object-oriented programming languages, and/or in assembly/machine languages. A computer program may be deployed in any form, including as a stand-alone program, or as a module, component, subroutine, or other unit suitable for use in a computing environment. A computer program may be deployed to be executed or interpreted on one computer or on multiple computers at one site, or distributed across multiple sites and interconnected by a communication network.

Figure 6:
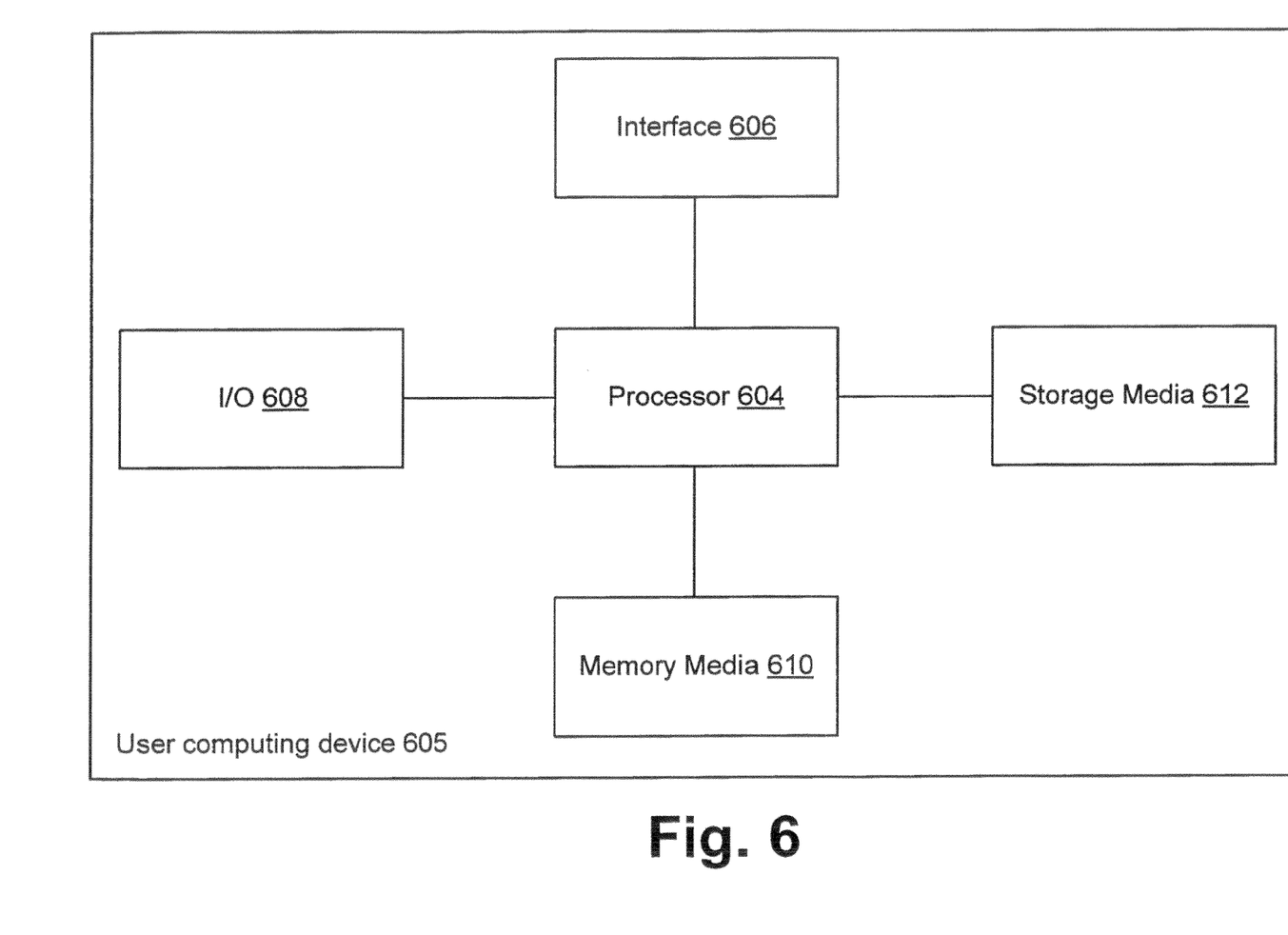
FIG. 6 is a high level block diagram of the computing device of FIG. 1 in accordance with an embodiment of the present disclosure.

A high level block diagram of a computing device is shown in FIG. 6. Computing device 602 is an example of computing device 105 and/or one or more of the servers 110, 115, 120 of FIG. 1 and contains a processor 604 which controls the overall operation of computing device 602 by executing computer program instructions which define such operation. The computer program instructions can be tangibly stored in a storage media 612 (e.g., magnetic or optical disk or other computer readable medium now known or to become known) and loaded into memory media 610 or read directly from media 610 when execution of the computer program instructions is desired. Computing device 602 also includes one or more interfaces 606 for communicating with other devices (e.g., locally or via a network). Computing device 602 also includes input/output 608 that represent devices that allow for user interaction with the computing device 602 (e.g., display, keyboard, mouse, speakers, buttons, etc.).

One skilled in the art will recognize that an implementation of an actual computing device will contain other components as well, and that FIG. 6 is a high level representation of some of the components of such a computing device for illustrative purposes, which may be, for example, a personal computer, PDA, wireless device, internet appliance, cellular telephone, or such processor driven technology. In addition, the processing steps described herein can also be implemented using dedicated hardware, the circuitry of which is configured specifically for implementing such processing steps. Alternatively, the processing steps can be implemented using various combinations of hardware, firmware and software.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the first or second computers or server or both. In this regard, any number of the features of the different embodiments described herein can be combined into single or multiple embodiments, and alternate embodiments having fewer than, or more than, all of the features described herein are possible. Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

The foregoing Description is to be understood as being in every respect illustrative and exemplary, but not restrictive, and the scope of the invention disclosed herein is not to be determined from the Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method comprising:
   monitoring, by a software application operating on a user computing device, a first display of video content transmitted over a network from a video server;
   detecting, by the software application, an action performed by a user of the user computing device on a first frame of the video content during display of the first frame of the video content, the action corresponding to the user overlaying on a plurality of portions of the displayed first frame of video content respective visible markings, the markings are overlapping and the markings are respectively associated with a plurality of objects appearing at respective locations in the first frame of the video content;
   iteratively deriving, by the software application, respective further positions for the plurality of markings in a further frame of the video content, the further positions for the markings associated with respective locations of the objects in the further frame, wherein each respective location of the object in the further frame is derived by:
      generating respective (Scale Invariant Feature Transform) SIFT vectors from interesting points extracted from the first frame and from interesting points extracted from the further frame;
      comparing the SIFT vector corresponding to the region of interest with the SIFT vector corresponding to the further frame;
      deriving a new positions of the interesting points from the comparison;
   generating, by the software application and during the display of the video content, video content metadata associated with the user, the video content metadata comprises position coordinate information of the visible markings in the first frame;
   transmitting, by the software application, the video content metadata comprising the coordinate information to a metadata server for storage;
   receiving a request from the user for a subsequent display of the video content; and
   in response to receiving the request for the subsequent display, retrieving (a) the video content over the network from the video server and (b) the video content metadata comprising the coordinate information from the metadata server in order to display the video content with the respective visible markings at the positions indicated by the coordinate information in the subsequent display of the video content in accordance with the video content metadata.

2. The method of claim 1 wherein generating the respective SIFT vectors further comprises applying a SIFT detector to a region of interest in the first frame to extract interesting points from the region and applying the SIFT detector to the further frame to extract interesting points corresponding to the object in the further frame.

3. The method of claim 1 further comprising generating a SIFT vector from the extracted points.

4. The method of claim 1 wherein the visible marking is on or surrounds the object.

5. The method of claim 1 wherein the detecting step further comprises applying an affine invariant point detector.

6. The method of claim 1 wherein the detecting step further comprises applying a segmentation technique.

7. The method of claim 1 wherein the detecting step further comprises applying a background modeling technique.

8. The method of claim 1 wherein the detecting step further comprises applying a supervised classifier technique.

9. The method of claim 1 wherein the video content metadata further comprises time information.

10. The method of claim 1, wherein respective locations of the objects in the further frame are different from the respective locations of the objects in the first frame.

11. A non-transitory computer readable storage medium tangibly storing computer program instructions capable of being executed by a computer processor on a computing device, the computer program instructions defining the steps of:
- monitoring, by a software application operating on a user computing device, a first display of video content transmitted over a network from a video server;
- detecting, by the software application, an action performed by a user of the user computing device on a first frame of the video content during display of the first frame of the video content, the action corresponding to the user overlaying on a plurality of portions of the displayed first frame of video content respective visible markings on the first frame of the video content, the markings are overlapping and the markings are respectively associated with a plurality of objects appearing at respective locations in the first frame of the video content;
- iteratively deriving, by the software application, respective further positions for the plurality of markings in a further frame of the video content, the further positions for the markings associated with respective locations of the objects in the further frame wherein each respective location of the object in the further frame is derived by:
  - generating respective (Scale Invariant Feature Transform) SIFT vectors from interesting points extracted from the first frame and from interesting points extracted from the further frame;
  - comparing the SIFT vector corresponding to the region of interest with the SIFT vector corresponding to the further frame;
  - deriving a new positions of the interesting points from the comparison;
- generating, by the software application and during the display of the video content, video content metadata associated with the user, the video content metadata comprises position coordinate information of the visible markings in the first frame;
- transmitting, by the software application, the video content metadata comprising the coordinate information to a metadata server for storage;
- receiving a request from the user for a subsequent display of the video content; and
- in response to receiving the request for the subsequent display, retrieving (a) the video content over the network from the video server and (b) the video content metadata comprising the coordinate information from the metadata server in order to display the video content with the respective visible markings at the positions indicated by the coordinate information in the subsequent display of the video content in accordance with the video content metadata.

12. A non-transitory computer readable storage medium of claim 11 wherein the computer program instructions for generating the respective SIFT vectors further comprise computer program instructions defining the step of applying a SIFT detector to a region of interest in the first frame to extract interesting points from the region and applying the SIFT detector to the further frame to extract interesting points corresponding to the object in the further frame.

13. A non-transitory computer readable storage medium of claim 11 further comprising computer program instructions defining the step of generating a SIFT vector from the extracted points.

14. A non-transitory computer readable storage medium of claim 11 further comprising computer program instructions defining the step of generating SIFT vectors from the interesting points extracted from the further frame.

15. A non-transitory computer readable storage medium of claim 11 wherein the visible marking is on or surrounds the object.

16. A non-transitory computer readable storage medium of claim 11 wherein the video content metadata further comprises time information.

17. A user computing device comprising a processor and a non-transitory storage medium comprising a software application, the software application when executed by the processor, causes the processor to:
- monitor a first display of video content received over a network from a video server;
- detect an action performed by a user of the user computing device on a first frame of the video content during display of the first frame of the video content, the action corresponding to the user overlaying on a plurality of portions of the displayed first frame of video content respective visible markings, the markings are overlapping and the markings are respectively associated with a plurality of objects appearing at respective locations in the first frame of the video content;
- iteratively derive respective further positions for the plurality of markings in a further frame of the video content, the further positions for the markings associated with the respective locations of the objects in the further frame wherein each respective location of the object in the further frame is derived by:
  - generating respective (Scale Invariant Feature Transform) SIFT vectors from interesting points extracted from the first frame and from the interesting points extracted from the further frame;
  - comparing the SIFT vector corresponding to the region of interest with the SIFT vector corresponding to the further frame;
  - deriving a new positions of the interesting points from the comparison;
- generate, during the display of the video content, video content metadata associated with the user, the video content metadata comprises position coordinate information of the visible markings in the first frame;
- transmit the video content metadata comprising the coordinate information to a metadata server for storage;
- receive a request from the user for a subsequent display of the video content; and
- in response to receiving the request for the subsequent display, retrieving (a) the video content over the network from the video server and (b) the video content metadata comprising the coordinate information from the metadata server in order to display the video content with the respective visible markings at the positions indicated by the coordinate information in the subsequent display of the video content in accordance with the video content metadata.

* * * * *